Figure 1:
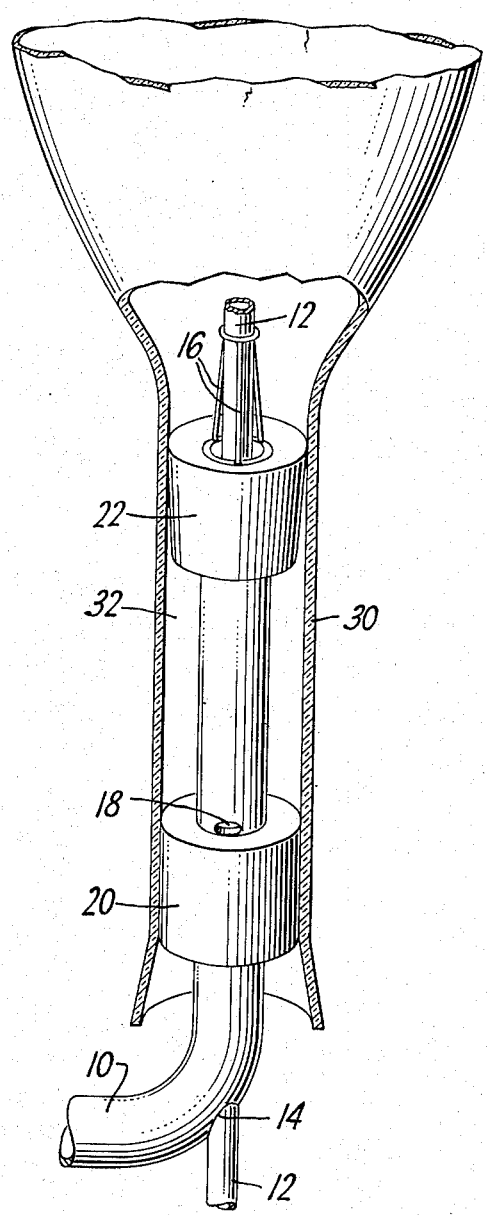

Nov. 30, 1954

C. SOLLAMI 2,695,593

APPARATUS FOR APPLYING CONDUCTIVE COATING

Filed May 14, 1952

INVENTOR
CARL SOLLAMI
BY
*F. Kumpf*
ATTORNEY

United States Patent Office 2,695,593
Patented Nov. 30, 1954

2,695,593

APPARATUS FOR APPLYING CONDUCTIVE COATING

Carl Sollami, Howard Beach, N. Y., assignor to Sylvania Electric Products Inc., a corporation of Massachusetts Application May 14, 1952, Serial No. 287,700

5 Claims. (Cl. 118—408)

This invention relates to an apparatus for fabricating cathode ray tubes. More particularly it relates to an apparatus for applying an internal coating such as aquadag to cathode ray tubes.

In the past internal coatings such as aquadag have been most commonly applied by a brushing technique. However, as the cathode ray tubes have gradually increased in size and as the trend has been toward the rectangular tubes rather than the round or conical tubes the application of the aquadag by brush techniques has become more and more difficult. In the case of the rectangular tubes the brush during the application of the aquadag tends to catch on the surface at the corners and cause a spattering of the aquadag onto the cathode ray screen. This result is naturally most undesirable and frequently leads to tube rejects. In the case of the larger and relatively narrower necked tubes the brush technique is also quite difficult in view of the limited space provided by the narrow neck in which to maneuver the brush.

It is therefore an object of this invention to provide apparatus for applying an aquadag coating to cathode ray tubes which is equally useful with all types of tubes and which eliminates the danger of contaminating the screen portions of the tube with any spattered aquadag.

It is a further object of this invention to provide apparatus which will enable the operator to coat selected portions of the interior of the cathode ray tube.

In accordance with this invention it has been found that all types of cathode ray tubes can readily be coated with an aquadag coating by flow-coating apparatus which will leave a satisfactory aquadag coating on the inner side walls of the cathode ray tubes but will yet permit the operator to obtain an uncoated neck portion.

In the drawings which illustrate a preferred embodiment of apparatus suitable for carrying out the method of this invention:

Figure 1 is a front elevation showing concentrically mounted filler and breather tubes with a pair of spaced rubber stoppers.

The apparatus of this invention consists essentially of concentrically mounted filler and breather tubes which are further provided with two spaced stoppers.

Apparatus embodying these features is illustrated in the drawings in which tube 10 is the filler tube and tube 12 is the breather tube. These, as is readily apparent, are concentrically mounted with respect to one another and further pass through the spaced stoppers or supports 20 and 22. In the drawings this apparatus is mounted within a cathode ray tube in much the position it would be when this apparatus is used in flow coating the cathode ray tube. As can there be seen the filler tube 10 extends up to the top surface of the second rubber stopper 22 whereas the breather tube 12 extends up beyond the point at which the aquadag coating is to extend on the side walls of the cathode ray tube. In the illustrated embodiment tube 12 is sealed into tube 10 at the bend at the place indicated by the numeral 14 and is given further support by means of a combination ring and tripod arrangement 16 just above rubber stopper 22. Tube 10 is further provided with an orifice at point 18 located directly above the stopper 20 between it and the lower portion of stopper 22. This orifice is a very essential feature in the apparatus illustrated as it permits the equalization of pressure on both sides of stopper 22 during the period in which aquadag solution is present in the cathode ray tube above stopper 22.

Figure 3:
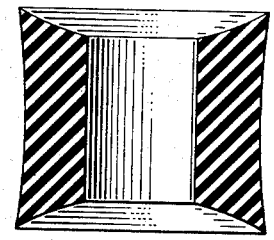
Figure 2:
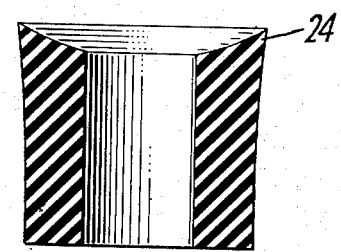

The two stoppers may naturally be made of any suitable material. Rubber stoppers which are quite easy to obtain are quite satisfactory and therefore preferably used. The lower stopper has the usual type shape of any stopper which is used to retain a solution within a bottle or jar whereas the upper stopper is preferably provided with a cusp or wiping edge such as shown in Figure 2 of the drawing at 24. This feature makes for a good clean seal between the stopper and the side walls of the cathode ray tube 30. If in some cases it may be desirable to use a stopper having a double cusp or wiping edge, a stopper of this type is shown in Figure 3 of the drawings. This cusp will also aid in providing a good wiping action for the side walls of the neck portion of the cathode ray tube when the apparatus is being withdrawn, after the application of the aquadag to the inside walls of the cathode ray tube. The cusp on the top stopper 22 is preferably present to present minimum resistance to the flow of the excess coating draining from the sides of the wall. It also helps to prevent the collection of any excess material at the point where the rubber edge is in contact with the side walls of the neck portion of the cathode ray tubes.

In order to use the apparatus of this invention the apparatus is introduced into the neck portion of the cathode ray tubes in a manner indicated in the drawings wherein stopper 20 fits into the end portion of the side walls of the neck of the cathode ray tube and stopper 22 which is slightly smaller in diameter slides upwardly within the neck to a point on the side wall of the neck at which it is desired to cut off the aquadag coating. The aquadag solution is then introduced into the cathode ray bulb through tube 10 displacing the air therein through breather tube 12. As the aquadag solution passes upwardly into the cathode ray tube and the pressure above the stopper 22 increases some of the aquadag solution seeps into the space 32 between the two rubber stoppers through orifice 18 until the pressure is equalized. This is essential if the upper stopper 22 is not to be dislodged from the desired position inasmuch as there is a considerable pressure buildup as the solution in the cathode ray tube is increased. If the pressure on either side of stopper 22 were not equalized there is a good chance that stopper 22 would be displaced or that the aquadag solution would tend to seep down and by-pass the stopper 22 since the pressure on the side walls is not sufficient to withstand the head of the material above. After the aquadag solution is brought up to the desired level it is permitted to drain out of the cathode ray tube. As the solution is draining out of the cathode ray tube through tube 10 the pressure on either side of stopper 22 is again automatically equalized by the aquadag solution passing out of pressure-equalizing chamber 32 through orifice 18. When all the liquid has been drained out of the cathode ray tube envelope a small pool of aquadag may be left behind in the free space.

As the aquadag solution is being drained out it is preferable to introduce compressed air at an elevated temperature through breather tube 12. This will help force the aquadag solution out faster and will also help to dry the coating that has been applied to the walls of the cathode ray tube above the stopper 22. Since the air passing up through tube 12 is warm the tube becomes heated and it in turn will tend to cause the air inside the free space 32 to become heated and cause moisture to condense on the walls of the cathode ray tube at this section. This moisture will remain present in view of the fact that there is no good air circulation in this space during the draining period. When the aquadag above the stopper 22 has dried sufficiently to prevent running of the coating the air is shut off and the assembly is withdrawn from the cathode ray tube. The condensed water on the side of the tube 30 lubricates the stopper 22 to make its withdrawal easier and also permit it to clean the surface. This leaves the bottom of the aquadag coating sharp and well defined.

The system and apparatus described above for flow coating eliminates tedious wiping of the tube neck surface and permits the use of narrow neck tubes which are almost impossible to hand-wipe. The apparatus provides additional advantages in that the drying of the aquadag is speeded up by the passage of the hot air which begins simultaneously with the draining out of the liquid inside the cathode ray tube.

While the above description and the drawings submitted herewith disclose preferred and practical embodiments of the apparatus for internally coating cathode ray tubes it will be understood by the specific details of construction and arrangement of parts as shown and described are by way of illustration and are not to be construed as limiting the scope of the invention.

What is claimed is:

1. Apparatus for flow application of an internal coating to an upright cathode ray tube having a bulb body and a depending neck comprising a pair of spaced apart supports conformable to said neck and adapted to be axially inserted into said neck of said cathode ray tube, first conduit means extending through said supports and having an open end in communication with the interior of said cathode ray tube above the uppermost support for introducing coating material, and second conduit means extending through said supports and having an open end in communication with the interior of said cathode ray tube at a location spaced above the open end of said first conduit means, the space between said supports when in said cathode ray tube defining a pressure-equalizing chamber, said first conduit means being formed with an opening in communication with said pressure-equalizing chamber, said uppermost support being constructed and arranged to serve as a wiper for the internal surfaces of said neck upon withdrawal of said supports from said neck of said cathode ray tube.

2. Apparatus for flow application of an internal coating to an upright cathode ray tube having a bulb body and a depending neck comprising spaced apart upper and lower supports conformable to said neck and adapted to be axially inserted into said neck of said cathode ray tube, a filler tube extending through said supports and having an open end in communication with the interior of said cathode ray tube above said upper support for introducing coating material, and a breather tube extending through said supports and having an open end in communication with the interior of said cathode ray tube at a location spaced above the open end of said filler tube, the space between said supports when in said cathode ray tube defining an isolated pressure-equalizing chamber, said filler tube being formed with an opening intermediate said supports and in communication with said pressure-equalizing chamber, said upper support having a slight inward taper from its upper edge, said upper edge serving as a wiper for the internal surfaces of said neck upon withdrawal of said supports from said neck of said cathode ray tube, said lower support having a substantial peripheral contact with said neck.

3. Apparatus for flow application of an internal coating to an upright cathode ray tube having a bulb body and a depending neck comprising upper and lower spaced apart supports conformable to said neck and adapted to be axially inserted into said neck of said cathode ray tube, a filler tube extending through said supports and having an open end in communication with the interior of said cathode ray tube above said upper support for introducing coating material, and a breather tube arranged concentrically of and within said filler tube and having an open end in communication with the interior of said cathode ray tube at a location spaced above the open end of said filler tube, the space between said supports when in said cathode ray tube defining a pressure-equalizing chamber, said filler tube being formed with an opening adjacent to and above said lower support and in communication with the lower end of said pressure-equalizing chamber, said upper support being constructed and arranged to serve as a wiper for the internal surfaces of said neck upon withdrawal of said supports from said neck of said cathode ray tube.

4. Apparatus for flow application of an internal coating to an upright cathode ray tube having a bulb body and a depending neck comprising spaced apart upper and lower supports conformable to said neck and adapted to be axially inserted into said neck of said cathode ray tube, a filler tube extending through said supports and having an open end in communication with the interior of said cathode ray tube above said upper support for introducing coating material, and a breather tube extending through said supports and having an open end in communication with the interior of said cathode ray tube at a location spaced above the open end of said filler tube, the space between said upper and lower supports when in said cathode ray tube defining an isolated pressure-equalizing chamber, said filler tube being formed with an opening intermediate said supports and in communication with said pressure-equalizing chamber, said upper support having a slight inward taper from its upper edge, said upper edge serving as a wiper for the internal surfaces of said neck upon withdrawal of said supports from said neck of said cathode ray tube.

5. Apparatus for flow application of an internal coating to an upright cathode ray tube having a bulb body and a depending neck comprising upper and lower supports conformable to said neck and adapted to be axially inserted into said neck of said cathode ray tube, a filler tube extending through said supports and having an open end in communication with the interior of said cathode ray tube above said supports for introducing coating material, and a breather tube arranged concentrically of and within said filler tube and extending through said supports, said breather tube having an open end in communication with the interior of said cathode ray tube at a location spaced above the open end of said filler tube, the space between said supports when in said cathode ray tube defining an isolated pressure-equalizing chamber, said filler tube being formed with an opening at the lower end of and in communication with said pressure-equalizing chamber, said upper support having a slight taper from its upper edge, said upper edge serving as a wiper for the internal surfaces of said neck upon withdrawal of said supports from said neck of said cathode ray tube.

References Cited in the file of this patent

UNITED STATES PATENTS

| Number | Name | Date |
|---|---|---|
| 2,077,378 | Deren | Apr. 20, 1937 |
| 2,444,572 | Leet et al. | July 6, 1948 |
| 2,445,645 | Stephens | July 20, 1948 |
| 2,480,358 | Curtis et al. | Aug. 30, 1949 |